Patented Sept. 27, 1938

2,131,432

UNITED STATES PATENT OFFICE 2,131,432

METHOD OF IMPROVING THE KEEPING QUALITIES OF REACTIVE MATERIALS

Augustus H. Fiske, Warren, R. I., assignor to Rumford Chemical Works, Rumford, R. I., a corporation of Rhode Island No Drawing. Application August 31, 1937, Serial No. 161,751

13 Claims. (Cl. 99—95)

The subject matters presented herein relate to processes of improvement in the keeping qualities in reactant mixtures.

It is well known that substances having like charges repel each other, and substances having unlike charges attract each other.

I have discussed this matter of electro-static repulsion and attraction quite fully in my co-pending application relating to the prevention of caking in pulverulent solids. Further to place my present invention in the art I note that J. J. Thompson in his "Recent Researches in Electricity and Magnetism" (ed. 1893), p. 174, calls attention to Kundt's and Lichtenberg's figures caused by the effect of an electrical discharge on a fine powder sprinkled on a plate. This effect indicates that fine pulverulent materials are effected by the electrostatic charge, and arrange themselves in connection with it.

One purpose of my invention is to prevent or deter mixtures of potentially reacting chemicals in a mixture from reacting by causing them mutually to repel each other through the influence of like electric charges induced into or upon them.

There are a great many mixtures in which components are in a free granular or pulverulent state and are more or less in direct contact with each other such as baking powders, selfrising flour mixtures, effervescent medical mixtures and like products which are well known to suffer deterioration after being kept, often for a relatively short time. Such have long required some basis of improvement of their keeping qualities, but little progress aside from improved containers and packagings seems to have been made.

For example, a mixture of two reactants as the gas forming ingredients of a baking powder, tend gradually to react with each other if they remain long in the can. By causing a mutual repulsion between the active ingredients by means of an electrostatic charge, it very materially slows down the rate of such usual gradual reaction or deterioration, thus importantly improving the so-called keeping quality of the baking powder.

Baking powders are usually composed of an acid ingredient or compound of ingredients and bicarbonate of soda as their active ingredients which are mixed with cornstarch as a diluent to standardize the strength and to keep the reactive particles apart. To improve the keeping quality of a baking powder, many inventions have been made. Catlin, U. S. Patent No. 474,811, disclosed that the use of granular materials instead of fine ones tended to improve the keeping quality. It is well known that extra drying of the ingredients have that tendency as well. I have previously shown (U. S. Patent No. 1,787,193) that the presence of a small amount of iron salts tends to improve the keeping quality of a baking powder.

My present invention provides an improvement in addition to all these, in the keeping quality of a baking powder, and it may be applied to any and all potentially reactive mixtures of pulverulent materials.

For the purposes of my present discussion I will take for an example a phosphate baking powder as typical of my reactive mixture as I have experimented very largely with such a product. Nevertheless, I do not wish to limit myself to this product and so it should be only considered as illustrative.

In the early days of the phosphate baking powder industry, the monocalcium acid phosphate, bicarbonate of soda and corn starch, which are the three standard or usual ingredients in this product, were always in a finely pulverulent condition. Catlin, already referred to, discovered that by making the active ingredients in a granular form the keeping quality was much enhanced. It is, however, much more expensive to prepare these ingredients in a granular condition and it would be more economical and preferable to use these active ingredients in a finely pulverulent form. It is the object of my invention to enable the phosphate baking powder manufacturer to use fine ingredients, particularly fine phosphate, without the marked decrease in keeping quality always shown when that form of material is used. Manufacturers of other types of baking powders will be similarly benefited by my invention.

My research based on averages of many experiments has shown that the relative average keeping quality of a baking powder made with fine pulverulent phosphate may be rated at about 267 if the keeping quality of the granular phosphate baking powder is taken as a standard of 1000.

For the purpose of further explanation and illustration of my invention I will compare the old results with that obtained when fine phosphate has been given an electrostatic charge, preferably of a positive (+) sign.

For example, baking powders in commercial type cans with loose covers have been retained for observation in our laboratory for a year. These samples were analyzed monthly. The standard granular baking powder showed its usual stability, but the baking powders made of fine phosphate treated with an electrostatic charge showed a keeping quality slightly but definitely superior even to the standard granular baking powder. The relative figures based on 1000 for the standard granular baking powder were 1069 for the treated fine phosphate baking powder. This result was an average figure and not an isolated experiment. Compared with the rating 276 obtained from similar baking powder mixtures which had not been given an electrostatic treatment, the definite advantage gained is clearly shown.

As a simple basis on which to treat the phosphate and bicarbonate of soda in accordance with my invention I suspend the ingredients separately in metal contact in a metal container at the positive (+) pole of an electrostatic machine, as before indicated with the terminals adjusted at least ¼" apart, cutting out the Leyden jars which are the usual equipment of one of these machines, and treating the material for at least one minute with the full electrostatic charge.

Instead of the Wimshurst type of generator I also used a spark coil, placing the powder in contact with a metal plate or container which was electrically connected with the positive (+) side of the spark coil. The electrical excitation of the material apparently is of the same quality in either case. That both materials be charged with electricity of the same sign is essential as upon this depends the repellant characteristics of the particles in the mixture.

After the fine phosphate and soda has been thus separately treated with the electric charge, they may then be mixed as in the following manner.

I have found that the soda should preferably be mixed with the starch and then the phosphate admixed with this mixture.

For illustration as a basis of operation I indicate as a formula:

| | Pounds |
|---|---|
| Bicarbonate of soda | 28 |
| Fine monocalcium phosphate | 35 |
| Starch | 37 |

The materials should be first carefully stirred then dried to remove moisture. For example, I usually dry the soda for about 16 hrs. @ 130° F. The phosphate ought preferably to be dried about 16 hrs. @ 160° F. The starch has been dried about 16 hrs. @ 212° F.

After being treated with the electric charge, the ingredients should come in contact with as little conductive metal as possible in the process of mixing, dry wood and other non-conducting materials are best for apparatus or parts. The ingredients or mixtures should not be sifted after mixing as this process tends to disarrange the particles which have arranged themselves in the mass under the influence of the electric charge. A rolling and stirring process of mixing and blending is best.

While I do not wish to be limited by theories which at best are of somewhat transient value, I will attempt helpfully to discuss some of the theoretical points involved in my invention, especially informatively as to why my treatment is so effective in improving the keeping quality of a baking powder.

It must be remembered that the deterioration of baking powder may be due to a number of causes and may be prevented by a number of physical and chemical precautions. Of these I have already mentioned a few. In the first place, we have as a basis of the premature chemical reaction which destroys the baking powder the reaction of the acid material in the mixture with the bicarbonate of soda. This may be indicated as follows:

$$HR + NaHCO_3 = Na\bar{R} + H_2O + CO_2$$

Where R is the acid radical, in practice R may represent the activity of acid phosphate, sodium aluminum sulphate, cream of tartar, tartaric acid or any other acidic material.

Such a reaction may be brought on prematurely as by unusual conditions of moisture. One of the first precautions of the baking powder manufacturer has been to exclude all probable sources of moisture. One way of establishing the desired condition is by pre-drying the ingredients as already stated and by making containers as tight as it is commercially practicable under the conditions of the marketing conditions as they exist.

Chemically the keeping quality may be improved by the addition of iron to the acid molecule, (U. S. Patent No. 1,787,193) hereinbefore referred to.

Physically I may provide the active ingredients in granular form as provided for according to Catlin, U. S. Patent No. 474,811, hereinbefore referred to. By so doing there are fewer particles to come in contact with each other to react, and fewer points of contact for the reaction to start.

In considering the points of contact between the particles it should be borne in mind that the spaces between the granular particles are filled with the inert diluent constituent of the baking powder, such as corn starch.

There is, however, in a modern well put together baking powder no particular reason that the granular soda and granular acid should remain apart in the process of mixing. As the process of mixing is necessarily a somewhat haphazard matter, the probable number of active particles remaining in contact at the end of the mixing process depends relatively directly on the number of active particles present in the mixture and inversely with the number of inert starch particles. It will be probable, therefore, that there will always be a considerable number of active particles in contact with each other in all baking powder mixtures and on these contacts, in proportion probably to their number (other conditions remaining equal) will depend the speed of deterioration of the baking powder.

In the past, attempts have been made to improve the keeping quality of a baking powder by coating the active particles of the baking powder with inert ingredients. This has never been particularly successful for no commercially successful types have ever adopted any of these proposed modifications.

My invention, however, contemplates the control of the location of the active ingredients of the baking powder in the mass of the mixture by making them mutually repellant to each other. This may be accomplished as already described, by giving them like electric charges. When the ingredients are mixed together and the mass is in a state of flux, they will naturally fall into place in the mass where they are farthest distant from each other and the inert ingredients of the baking powder mixture will have the greatest amount of space to come in between the active particles.

That my processes or methods are successful in greatly improving the keeping quality is indicated by the demonstrated results, and I believe that the cause is due to the action which I have described.

I have suggested herein the theory of physical repulsion of particles of the reactants of a baking powder as in this respect they seem to conform to such conditions as were observed in my researches in other materials. However, I recognize in my baking powder researches according to my present invention that there seems to be a chemical inhibition set up by the electrical charge. I am not able to offer an exact theory at this time and do not wish to be limited by any theory in such a difficult and delicate matter where proofs are practically impossible and where observations at best are difficult. I am unable to do more therefore than to point out that whether it be by an aura of repulsion about the particles or an energy repulsion, as if there were a chance for a combination plus and minus additions, the improved results are secured. As according to my invention particles are charged with electricity of like sign the energy cannot form in a free state and so the chemical reactions which do form the free energy cannot take place. This, however, is to be understood merely as a voluntary observation but perhaps helpful to others who will practice my invention. As herein disclosed the invention is perfectly definite and workable and the products are of enhanced value.

What I therefore claim and desire to secure by Letters Patent is:—

1. In a method of improving the keeping qualities of baking powder comprising acid and alkaline reactants, that step consisting in charging each of the reactive factors separately with an electrostatic charge of high intensity and like sign to render their respective particles mutually repellant.

2. The method of making baking powder consisting in separately charging the bicarbonate of soda and the acid reactant with an electrostatic charge of like sign and high intensity, in mixing the bicarbonate of soda with an inert pulverulent diluent and in mixing the charged acid in such mixture.

3. The method of making baking powder consisting in separately charging the bicarbonate of soda and the acid reactant with an electrostatic charge of like sign and high intensity, in mixing one of said charged ingredients with an inert pulverulent diluent, and in mixing the other charged ingredient in such mixture.

4. The method of making baking powder consisting in separately charging the bicarbonate of soda and the acid reactant with an electrostatic charge of like sign and high intensity, in mixing said ingredients separately with an inert pulverulent diluent.

5. A process of preventing premature reaction of mixtures of finely divided, electrically chargeable, chemically reactive materials consisting in charging before mixing each of the reactive ingredients separately with an electrostatic charge of like sign to render the particles mutually repellant, and mixing the separately charged ingredients.

6. The process of claim 5 in which the charge is of positive sign.

7. The process of claim 5 in which the materials are dried before charging.

8. The process of claim 5 in which one of the charged materials is mixed with an inert pulverulent diluent before mixing with the other charged material.

9. A baking powder comprising an alkaline reactant and an acid reactant, both carrying electrostatic charges of the same sign.

10. A fine pulverulent baking powder carrying a charge of electricity of one sign only.

11. The baking powder of claim 9 having a keeping quality of approximately 1069 where the standard is 1000 for granular baking powder and 267 for pulverulent baking powder.

12. The baking powder of claim 9 in which the acid reactant is a phosphate and the mixture has a keeping quality of approximately 1069 where the standard is 1000 for granular phosphate and 267 for pulverulent phosphate.

13. A new article of commerce consisting of a mixture of finely divided, electrically chargeable materials chemically reactive with each other, the particles of each ingredient of such mixture carrying a separate charge of electricity of the same sign whereby said ingredients are rendered mutually repellant and reaction of one with the other is avoided.

AUGUSTUS H. FISKE.